Nov. 8, 1949     J. E. GERRY     2,487,329
TORQUE ARM QUICK DISCONNECT ASSEMBLY
Filed March 21, 1947
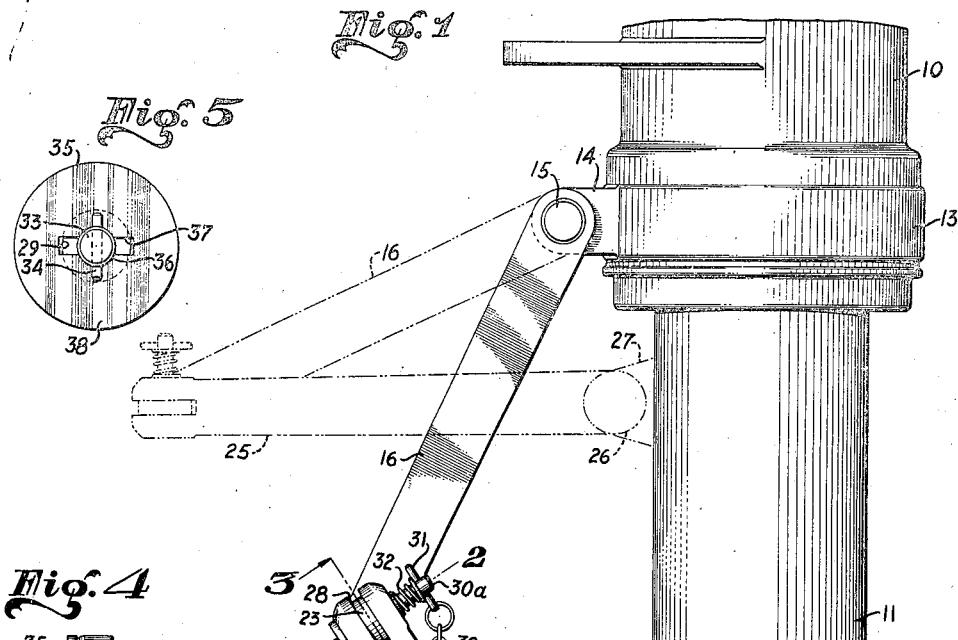
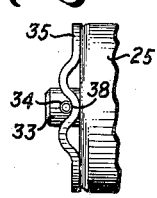
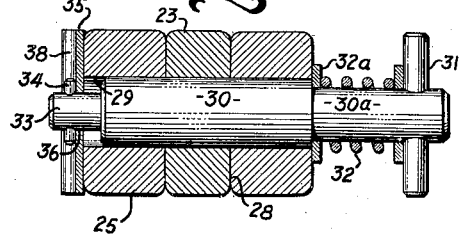
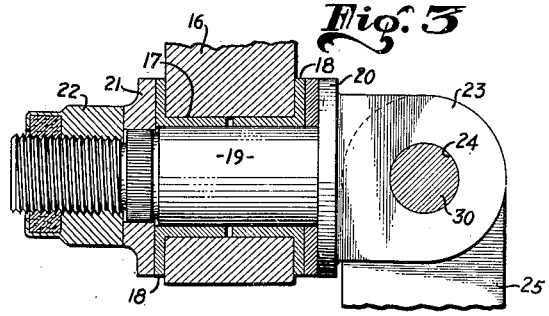
INVENTOR:
JULIAN E. GERRY
BY Huebner, Maltby
and Beehler
ATTORNEYS.

Patented Nov. 8, 1949

2,487,329

UNITED STATES PATENT OFFICE 2,487,329

TORQUE ARM QUICK DISCONNECT ASSEMBLY

Julian E. Gerry, Burbank, Calif., assignor to Menasco Manufacturing Company, Burbank, Calif., a corporation of California Application March 21, 1947, Serial No. 736,334

4 Claims. (Cl. 287—1)

This invention relates to aircraft landing gear and more especially to quick disconnect features for the torque arm assembly thereof.

This invention is directed particularly to the landing gear of aircraft of the type wherein a landing wheel frame is secured to a piston which is reciprocable in a cylinder having hydraulic and pneumatic cushioning characteristics to receive and absorb the ground shocks when the craft is landing. Details of the cylinder and piston structure do not form a part of the present invention and are therefore not shown.

In landing gear of this type the piston and wheel frame may be turned or rotated by the pilot of the craft; however, when the craft is being maneuvered on the ground, such as by being towed by tractor or other land vehicle, it is important that the steering means for the wheel frames be disconnected from the steering mechanism actuated by the pilot. The wheel frame and piston are connected to a steering collar on the cylinder by a torque arm assembly and this assembly is provided with quick disconnect features which are the subject of this invention.

It is, therefore, the general object of my invention to provide a torque arm structure for aircraft landing gear having means to permit quick separation of the torque arm members.

A more specific object of the invention is to provide a novel torque arm assembly of the character described having a bearing member pivotally secured to one of the torque arm members by a simple retractable pin which is readily withdrawn to permit the disconnection but is securely held in position when the torque arms are connected.

Other objects and advantages will appear and be brought out more fully in the following specification considered with reference to the accompanying drawing throughout which like parts are designated by like numerals.

In the drawing:

Figure 1 is a side elevation view of a portion of a landing gear unit showing the torque arm quick disconnect assembly of my invention.

Figure 2 is an enlarged sectional view taken along the line 2—2 of Figure 1.

Figure 3 is an enlarged sectional view taken along the line 3—3 of Figure 1.

Figure 4 is a fragmentary enlarged view showing the end of one of the torque arms and the securing means.

Figure 5 is an end view of the features shown in Figure 4.

Referring more particularly to the drawing I show a hydraulic and pneumatic cylinder 10 suitably mounted to an under portion of an aircraft in which cylinder a piston 11 is reciprocable, a wheel frame 12 being integrally associated with or suitably secured to the piston. A steering collar 13 is bearing mounted on cylinder 10 and suitably connected by linkage to steering apparatus actuatable by the pilot. Collar 13 has a tongue 14 providing a bearing for a bearing pin 15 to which is also connected one end of a torque arm link member 16.

Link 16 has a bearing aperture 17 at its other end and a pair of bearing members 18 are disposed in aperture 17 and provide a bearing for a swivel pin bearing member 19. Member 19 has a thrust collar 20 adjacent one of the bearing members 18 and a washer 21 is held against the other bearing member 18 by a lock nut 22 on a threaded end portion of bearing member 19. Bearing member 19 has a tongue 23 formed with a bearing bore or aperture 24.

A torque arm link member 25 is pivotally connected at one end by bearing pin 26 to a tongue 27 on piston 11 and has its other end slotted at 28 to receive tongue 23 and is formed with bore portions 29 formed transversely to the slot.

A pin 30 extends through bores 24 and 29 and has a handle portion 31 which provides mounting for one end of spring 32, the other end of which is seated against a collar 32a on a reduced portion 30a of pin 30. The other end of pin 30 has a reduced portion 33 and a stud pin 34 is suitably secured in a transverse bore in reduced portion 33. Stud 34 is shorter than the diameter of bores 24 and 29 so as to permit the pin 30 to be withdrawn from and inserted in these bores.

A plate or disc 35 is secured as by welding or otherwise to link member 25 and has a circular aperture 36 which is aligned with bore 29, aperture 36 having a diameter somewhat greater than the diameter of reduced end portion 33. Aperture 36 has a pair of radial extensions or enlargements 37 of a size to permit stud 34 to pass therethrough. The plate is further formed with a diametric groove 38 formed at substantially right angles to aperture enlargements 37. Pin 30 is secured to a chain 39 which is fastened to link 25 to retain the pin in association with the assembly.

The operation of the invention should be apparent from the foregoing description. When it is desired to disconnect the torque arms 16 and 25, pin 30 is pressed inwardly against the pressure of spring 32 to disengage stud 34 from groove 38 and upon the pin being rotated to align the stud with aperture extensions 37, the pin may be withdrawn through bores 24 and 29 and tongue 23 may be readily withdrawn from slot 28. The landing wheel frame 12 is now free from control from steering collar 13 and may be turned as desired by ground crew apparatus. The torque arms 16 and 25 may, when desired, be re-connected by inserting tongue 23 in slot 28, replacing pin 30 in bores 24 and 29 and positioning stud 24 in groove 38.

Although I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices and systems.

Having thus described my invention, what I claim as new and desire to secure by Letters Patent is:

1. A quick disconnect assembly comprising in combination a first link member, a second link member having an end slot and a transverse bore, a pivot member pivotally secured to said first link member and having a tongue in said end slot, said tongue having a transverse bore therethrough, a retractable locking pin having a handle at one end and an intermediate portion fitting within said bores, spring means normally urging said pin in the direction of the handle, a reduced portion at the end of the pin remote from the handle having a radial aperture therein and a stud fixed in said aperture having a length not greater than the diameter of said bore, an apertured plate overlying the side of the link member adjacent said last named reduced portion adapted to receive said reduced portion, and a radial opening in said plate adapted to admit passage of said stud.

2. A quick disconnect assembly comprising in combination a first link member, a second link member having an end slot and a transverse bore, a pivot member pivotally secured to said first link member and having a tongue in said end slot, said tongue having a transverse bore therethrough, a retractable locking pin having a handle at one end and an intermediate portion fitting wtihin said bores, said pin having adjacent the handle a reduced portion and a spring around the reduced portion pressed between the handle and the adjacent side of the link member, a reduced portion at the end of the pin remote from the handle having a radial aperture therein and a stud fixed in said aperture having a length not greater than the diameter of said bore, an apertured plate overlying the side of the link member adjacent said last named reduced portion adapted to receive said reduced portion, means on said plate adapted to receive said stud and a radial opening in said plate angularly disposed relative to said means adapted to admit passage of said stud.

3. A torque arm quick disconnect assembly comprising in combination a first link member, a second link member having an end slot and a transverse bore and an apertured plate, a pivot member pivotally secured to said first link member and having an apertured tongue in said slot, and a retractable locking pin extending through said second link member, said bore and said plate and said tongue aperture, said plate having a radial groove and said pin having a radial stud adapted to engage in said groove, the aperture of said plate having a radial enlargement at an angle to said groove to permit said stud to pass therethrough.

4. A torque arm quick disconnect assembly comprising in combination a first link member, a second link member having an end slot and a transverse bore and an apertured plate, a pivot member pivotally secured to said first link member and having an apertured tongue in said slot, and a retractable locking pin extending through said second link member, said bore and said plate and said tongue aperture, said plate having a radial groove and said pin having a radial stud adapted to engage in said groove, the aperture of said plate having a radial enlargement at an angle to said groove to permit said stud to pass therethrough, said pin being spring biased to seat said stud in said groove.

JULIAN E. GERRY.

REFERENCES CITED

The following references are of record in the file of this patent:

UNITED STATES PATENTS

| Number | Name | Date |
|---|---|---|
| 227,393 | Stanhope, Jr. | May 11, 1880 |
| 1,222,997 | Rottmer | Apr. 17, 1917 |
| 1,394,464 | Bentley | Oct. 18, 1921 |
| 1,414,737 | Gulick | May 2, 1922 |

FOREIGN PATENTS

| Number | Country | Date |
|---|---|---|
| 699,300 | Germany | Nov. 26, 1940 |